(No Model.) 3 Sheets—Sheet 1.

G. H. SPAULDING.
GAVEL SIZING MECHANISM FOR REAPERS.

No. 282,581. Patented Aug. 7, 1883.

Witnesses:
J. F. Steward
John B. Kaspari

Inventor:
Geo. H. Spaulding (No Model.) 3 Sheets—Sheet 2.

G. H. SPAULDING.
GAVEL SIZING MECHANISM FOR REAPERS.

No. 282,581. Patented Aug. 7, 1883.

Witnesses:
J F Steward
John B. Kaspari

Inventor:
Geo. H. Spaulding (No Model.) 3 Sheets—Sheet 3.

G. H. SPAULDING.
GAVEL SIZING MECHANISM FOR REAPERS.

No. 282,581. Patented Aug. 7, 1883.

Witnesses:
J. F. Steward
John B. Haspari

Inventor:
Geo. H. Spaulding

N. PETERS, Photo-Lithographer, Washington, D. C.

UNITED STATES PATENT OFFICE.

GEORGE H. SPAULDING, OF CHICAGO, ILLINOIS, ASSIGNOR OF ONE-HALF TO WILLIAM DEERING, OF SAME PLACE.

GAVEL-SIZING MECHANISM FOR REAPERS.

SPECIFICATION forming part of Letters Patent No. 282,581, dated August 7, 1883.

Application filed January 16, 1883. (No model.)

*To all whom it may concern:*

Figure 1:
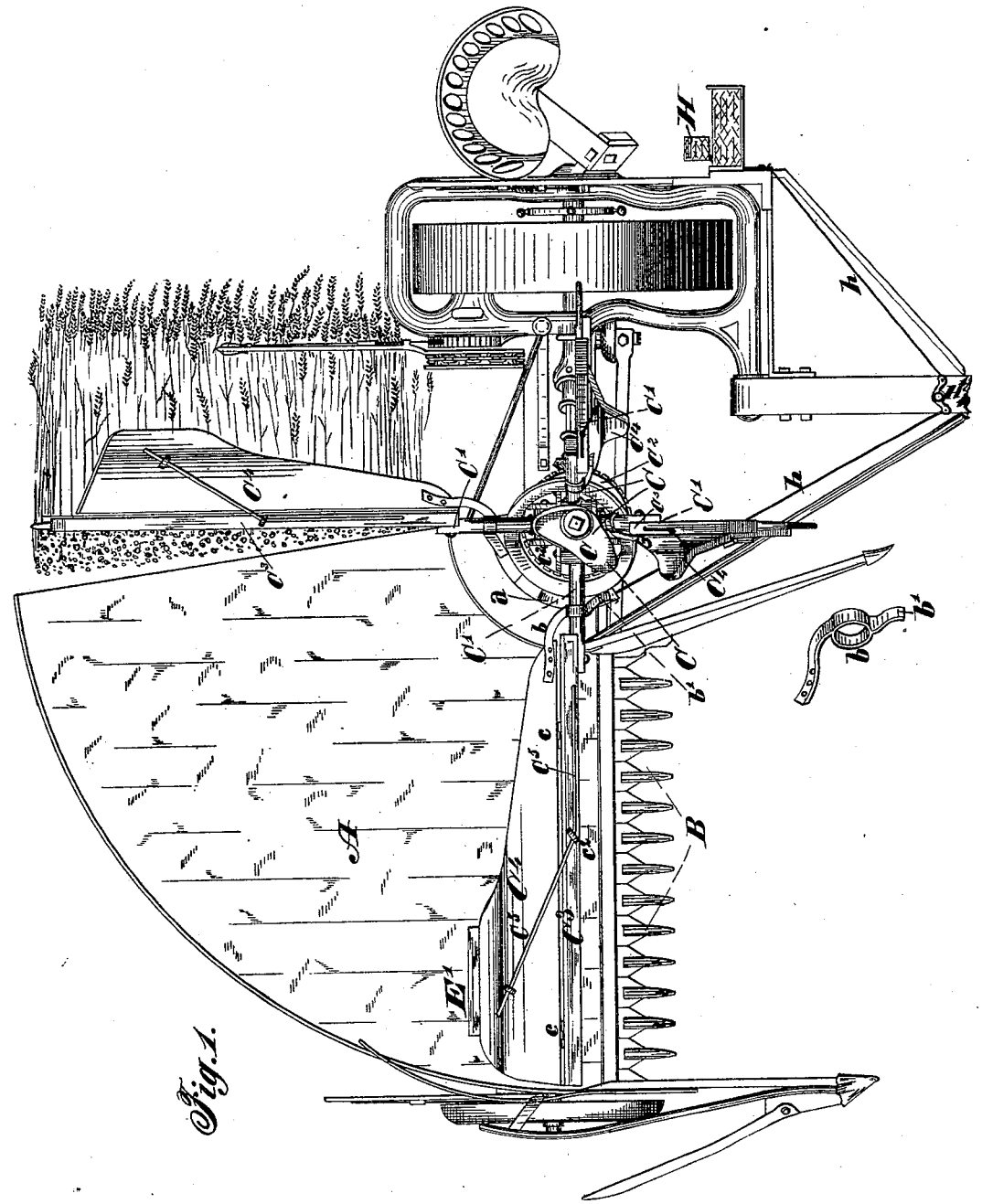
Figure 2:
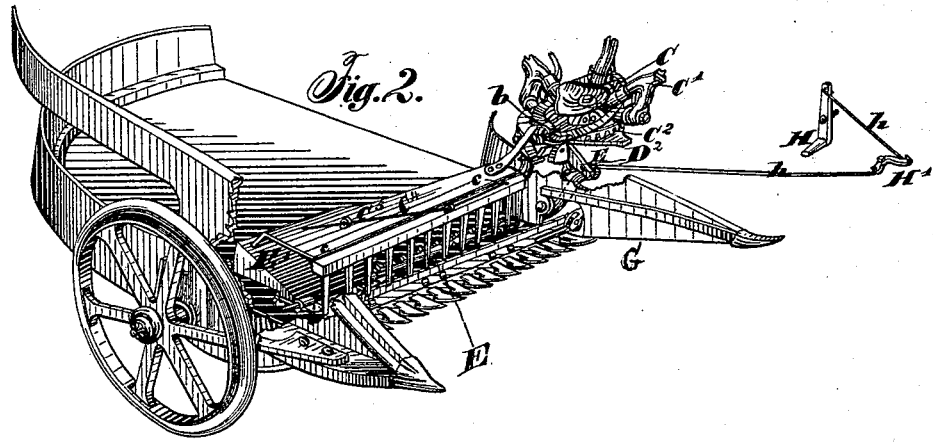
Figure 3:
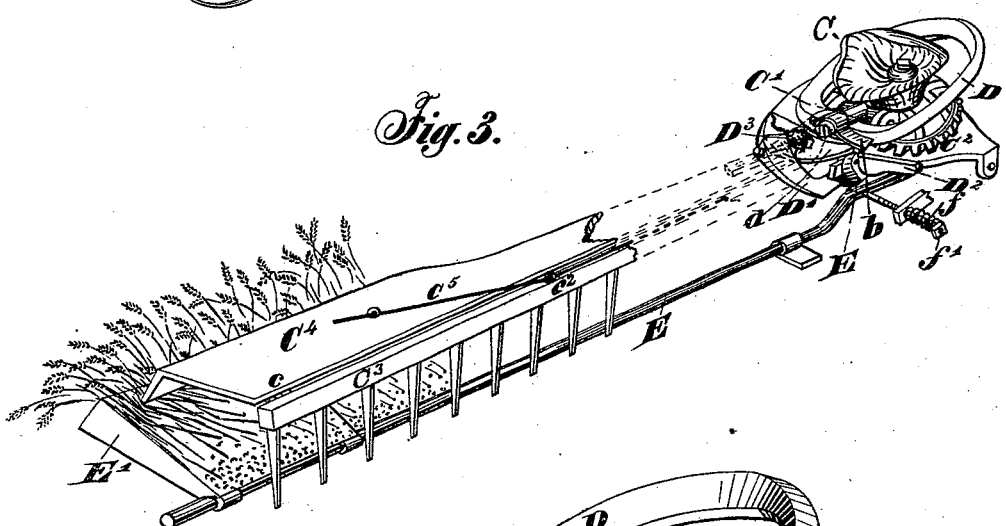
Figure 4:
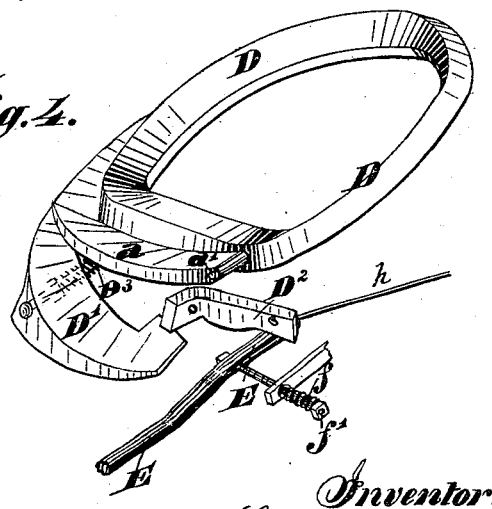
Figure 5:
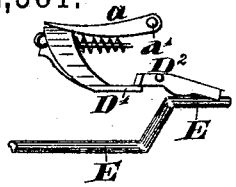
Figure 6:
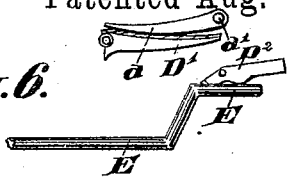
Figure 7:
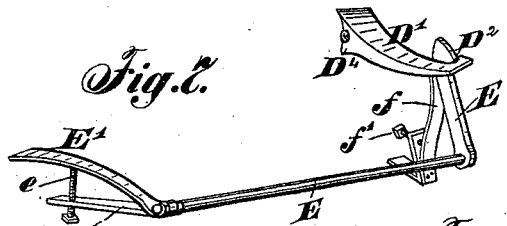

Be it known that I, GEORGE H. SPAULDING, a citizen of the United States, residing at Chicago, in the county of Cook and State of Illinois, have invented certain new and useful Improvements in Gavel-Sizing Mechanism for Reapers, of which the following is a full description, reference being had to the accompanying drawings, in which—
Figure 1 is a plan view of a reaper with my improvements attached; Fig. 2, a perspective view of the same; Fig. 3, a perspective view of those parts which constitute my invention; and Figs. 4 to 10, inclusive, are perspective views showing details.

The object of my invention is to make the rake wholly automatic in its action; and its nature consists in providing mechanism by means of which the rake may be caused to sweep the platform when a sufficient quantity of grain has accumulated to form a gavel, and this independent of the distance traveled by the machine.

In the drawings, A is a quadrant-platform, and B the cutting apparatus. C is the rake-stand, and C′ the rake-arms hinged to the gear-wheel C², which revolves on a vertical axis and is driven from the main gearing. The rising and falling motion of the rake-arms is produced and controlled by the cam D and the switch D′. At such points as the arms C′ are controlled by the cam D they simply slide around on it; but each arm is provided with a down-hanger and anti-friction roller in such position as to be operated upon by the switch D′, which does not differ from many now used, its office being, when turned downward so that its point shall come beneath the anti-friction roller, to guide the latter up, and when released by the catch D² and its point thrown upward by the action of the spring D³ to permit the roller to pass under, and thus hold the rake down while sweeping the platform. The switch is provided below and near its pivot with a slight heel, with which the roller in passing will come in contact, thus throwing the long end downward into position to be held by the catch D².

The parts so far described form no part of my invention and need no further mention than that necessary to describe the operation of the machine.

Beneath the floor of the platform, parallel with and just behind the cutting apparatus, I place the rock-shaft E, supported in suitable bearings, and having its end upturned, as shown, to come in contact with the lower surface of the catch D².

E′ is a flat arm, secured firmly yet adjustably to the shaft E near the divider end of the platform. Its position along the platform may be at any point so far from the stubble end as to be beneath the falling grain when the machine is not cutting full width. A space is provided in the platform in which the arm E′ vibrates or into which it may be pressed.

C⁴ is a wing hinged to the rake-head C³ at $c\ c$, and reaching in advance of the rake, and capable of vibrating on its hinges. Its width is about equal to the length of the arm E′.

C⁵ is a torsion-spring of steel wire, one end being bent abruptly and thrust into a small hole in the upper surface of the rake-head C³. It then passes through a staple, $c^2$, also thrust into the rake-head, and is bent outward over the wing C⁴ and enters an eye therein. The office of this spring is to keep the wing turned upward in relation to the rake-head, to which it is hinged. The wing is shown thrown downward. The stress of the spring is sufficient to raise it out of contact with the grain when released by devices hereinafter described.

To the narrow end of the wing—that end next the harvester-frame—is riveted the arm $b$, as shown in Fig. 1. This arm has near its middle an eye, through which passes the rake-arm C′, which forms an axis on which said arm vibrates. The wing is thrown down through this arm by means now to be described.

To the cam D, I pivot the cam $a$ at $a'$, as shown, its position being such that its pivoted end shall at all times be in the path of the end $b'$ of the arm $b$, whereby the latter, as it passes over it, will be vibrated on its axis and the wing thrown down. The normal position of the cam $a$ is nearly horizontal, with its free end resting on the switch D′, except when the anti-friction roller of the rake-arm passes over the switch and lifts it. Were it not for the necessity of providing a passage-way for the roller aforesaid, the cam $a$ might be fixed to the cam. Its position may be changed, so as not to come in contact with the roller; but I prefer to make it as shown.

The arm E′ is loosely secured on the rock-shaft E.

$e'$ is a projecting arm on the shaft E, provided with a threaded eye, through which passes an adjusting-screw, $e$, upon which rests the arm E′. By turning the screw the height of the arm E′ may be varied. (See Figs. 7 to 10, inclusive, in which the wide sheet-iron covering is removed to expose the parts.)

In Figs. 7 to 10 I show the upturned end of the shaft E as an arm formed with a latch, $D^2$, to engage the switch D′ and hold it down. It is shown as a piece secured to the shaft; but I design it to be as one piece with the shaft, and hence have designated it by the same letter. Acting to draw the upturned arm of the shaft E forward is the spring $f$. (Shown as a coiled spring in Figs. 3, 4, 8, and 9, and as a flat spring in Fig. 7.) $f'$ is a screw by which the tension of the spring is adjusted.

Figure 10:
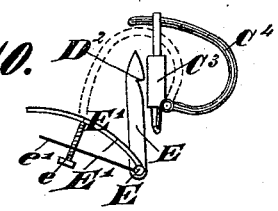
Figure 8:
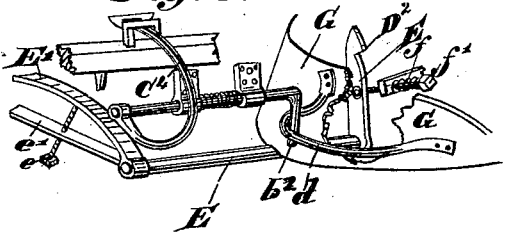
Figure 9:
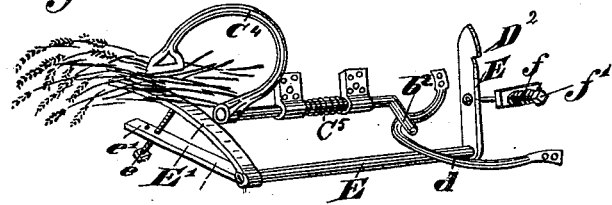

In Figs. 8, 9, and 10 I have shown the wing $C^4$ as a shaft journaled on the rake-head $C^3$, with its part $b^2$ adapted to engage the gathering-rod $d$ on the divider-board G, and with an upturned curve reaching up and over the rake-head and made wide at its end where it opposes the arm E′. In this form the spring for retracting the wing is a spiral one surrounding the shaft.

I have shown the wing $C^4$ in all of its forms as opposed by the yielding arm E′, the latter being made adjustable; but the wing may be made adjustable, so as to move closer to the arm E′, thus producing the same result.

H is a pedal within easy reach from the driver's seat, and connected by the rods $h\ h$ and bent lever H′ to the catch $D^2$, so that the latter may be controlled at will.

The operation of my invention is as follows: The cut grain falls on the platform in the usual manner, the rakes performing only their offices as reels to bring the grain to the cutting apparatus, and it accumulates on the arm E′. At the instant the rake-head reaches the position shown in Figs. 1, 2, and 3 the short arm $b'$ strikes the cam $a$, and the wing is thrown downward for an instant, but is raised by the spring $C^5$ as soon as the arm $b'$ passes off from the cam $a$. After the passage of two or three rakes in this manner, the accumulation of the grain on the arm E′ will be so great that the distance between the wing in its lower position and the arm E′ will be more than filled by the grain, and so the wing, through the mass of grain, will press the arm E′ downward, thus rocking the shaft E and disengaging the locking-latch $D^2$ from the switch D′. This will permit the latter to rise and the anti-friction roller on the rake-arm to pass under it, thus depressing the rake, which will then operate to sweep the accumulated gavel across the platform and to the ground.

It will thus be seen that I have a rake that will automatically produce gavels of substantially uniform size, the result being attained by calipering the mass of grain on the platform as each rake passes.

By the use of the pedal and the connections the latch $D^2$ is under the control of the attendant, who may thus drop gavels at will.

What I claim is—

1. The combination of the rake-head $C^3$, the vibrating wing $C^4$, the rake-switch, and intermediate tripping mechanism, for the purpose specified, substantially as described.

2. The combination of the rake-head, the wing hinged thereto, the arm $b$, its operating-cam $a$, the rake-tripping mechanism, and intermediate operating mechanism, substantially as described.

3. In a reaper, the yielding arm E′, upon which the cut grain accumulates, in combination with the opposing vibrating wing $C^4$ and the rake-tripping mechanism, substantially as described.

4. In a reaper, the arm upon which the grain falls, in combination with an opposing automatically-vibrating wing, means by which their distance apart may be adjusted, and the rake-tripping mechanism, substantially as and for the purpose described.

5. In a reaper, the arm E′, in combination with the wing $C^4$, means by which the latter is vibrated to approach the former while passing over it to clasp the grain between them, said arm adapted to yield under the pressure transmitted through the clasped grain, and rake-tripping mechanism, substantially as and for the purpose described.

6. In a reaper, the combination of the rake-tripping mechanism, the arm E′, adapted to yield under pressure, the wing $C^4$, means whereby the latter is caused to approach said arm while passing above it to clasp the grain between them, the spring $f$, and intermediate operating mechanism, substantially as described.

7. The combination of the rake-tripping mechanism, the arm E′, adapted to yield under pressure, the wing $C^4$, means by which the said arm and wing are caused to clasp the grain between them, the spring $f$, means by which the tension of the spring is adjusted, and connecting mechanism, substantially as described.

8. The combination of the arm E′ with the switch D′ and suitable connecting mechanism, substantially as and for the purpose described.

9. The combination of the shaft E′, the arm E′, adjustably secured thereto, the switch D′, and intermediate mechanism, substantially as and for the purpose set forth.

10. In a reaper, the reel-rake provided with the switch D′, in combination with the catch $D^2$ and means adapted to be operated by the pressure transmitted through the accumulated grain to disengage said catch $D^2$, substantially as and for the purpose described.

11. The combination of the switch D′, the catch $D^2$, means adapted to be operated by the pressure transmitted through the accumulated grain to disengage said catch, and the adjustable spring $f$, substantially as set forth.

12. The rake-arm, the wing $C^4$, the arm $E'$, the latch $D^2$, connecting mechanism, the switch $D'$, and the driving mechanism, as and for the purpose described.

13. The automatic gavel - sizing raking mechanism, as described, in combination with adjustable mechanism and suitable connecting mechanism within reach of the attendant, whereby said sizing mechanism may be controlled at will, substantially as set forth.

14. In a reaper, the gavel-sizing mechanism, consisting of the reel which gathers the standing grain to the cutters, the rake for sweeping the cut grain off of the platform, a yielding device upon which the grain falls as it is cut, means for transmitting pressure to said yielding device through the grain when a sufficient quantity has accumulated thereon, and means connected with said yielding device for putting the rake into operation to sweep off the gavel, all constructed and combined substantially as described.

GEO. H. SPAULDING.

Witnesses:
J. F. STEWARD,
JOHN B. KASPARI.